(12) United States Patent
Motegi et al.

(10) Patent No.: US 10,933,805 B2
(45) Date of Patent: Mar. 2, 2021

(54) AUTOMATIC DRIVING SYSTEM

(71) Applicant: SUBARU CORPORATION, Tokyo (JP)

(72) Inventors: Keisuke Motegi, Tokyo (JP); Hikaru Yoshikawa, Tokyo (JP); Shota Yoshimura, Tokyo (JP); Masatoshi Minakawa, Tokyo (JP); Kazuki Takahashi, Tokyo (JP); Shingo Ugajin, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/711,009

(22) Filed: Dec. 11, 2019

(65) Prior Publication Data

US 2020/0254927 A1    Aug. 13, 2020

(30) Foreign Application Priority Data

Feb. 13, 2019 (JP) .............................. JP2019-023675

(51) Int. Cl.

| | |
|---|---|
| *B60Q 1/22* | (2006.01) |
| *B60Q 1/54* | (2006.01) |
| *B60Q 1/26* | (2006.01) |
| *G06K 9/00* | (2006.01) |
| *B60W 40/105* | (2012.01) |

(52) U.S. Cl.
CPC ............... *B60Q 1/54* (2013.01); *B60Q 1/268* (2013.01); *B60W 40/105* (2013.01); *G06K 9/00362* (2013.01); *G06K 9/00805* (2013.01); *B60W 2554/00* (2020.02)

(58) Field of Classification Search
None
See application file for complete search history.

(56) References Cited

U.S. PATENT DOCUMENTS

| | | | |
|---|---|---|---|
| 2015/0258928 A1* | 9/2015 | Goto | ........................ B60Q 1/24 701/49 |
| 2017/0262715 A1* | 9/2017 | Kozuka | .................. G08G 1/166 |

(Continued)

FOREIGN PATENT DOCUMENTS

JP    2015-174541 A    10/2015

*Primary Examiner* — Julie B Lieu
(74) *Attorney, Agent, or Firm* — McDermott Will & Emery LLP (57) ABSTRACT

An automatic driving system includes a vehicle control calculator, a f recognizer, a passerby recognition calculator, and a notifier. The vehicle control calculator causes an vehicle to perform automatic traveling along a traveling route. The recognizer acquires information on a traveling environment ahead of the vehicle. The passerby recognition calculator recognizes a passerby ahead of the vehicle based on the information on the traveling environment. The notifier notifies the passerby of a recognition state that the passerby is recognized, when the passerby is recognized by the passerby recognition calculator. The passerby recognition calculator examines whether the recognized passerby is facing a direction of the vehicle based on information on the passerby, acquired by the recognizer, and specifies the passerby as a notification target passerby when recognizing the passerby facing the direction of the vehicle. The notifier notifies the recognition state to the notification target passerby.

8 Claims, 9 Drawing Sheets

(56) References Cited

U.S. PATENT DOCUMENTS

| | | | |
|---|---|---|---|
| 2017/0285649 A1* | 10/2017 | Debreczeni | G08G 1/16 |
| 2018/0174460 A1* | 6/2018 | Jung | B60Q 1/525 |
| 2018/0319328 A1* | 11/2018 | Takae | B60Q 1/2607 |
| 2019/0347938 A1* | 11/2019 | Chase | G06K 9/2018 |
| 2019/0359128 A1* | 11/2019 | Harper | B60Q 5/006 |
| 2020/0066159 A1* | 2/2020 | Chase | B60Q 5/005 |
| 2020/0180502 A1* | 6/2020 | Mitsuya | B60Q 1/143 |

* cited by examiner

AUTOMATIC DRIVING SYSTEM

CROSS-REFERENCE TO RELATED APPLICATIONS

The present application claims priority from Japanese Patent Application No. 2019-23675 filed on Feb. 13, 2019, the entire contents of which are hereby incorporated by reference.

BACKGROUND

The technology relates to an automatic driving system in which, when a passerby passing on a roadside zone is detected at the time of an own vehicle traveling by automatic driving, the passerby is notified that the own vehicle recognizes the passerby.

In the recent vehicle technology field, various automatic driving systems have been proposed to reduce burden for drivers and make traveling safe and comfortable. The automatic driving system recognizes a travel path for an own vehicle based on a degree of coincidence obtained by constantly comparing the road shape on a map of a road where the own vehicle is traveling, detected by a map locator, and the road shape of a lane where the own vehicle is actually traveling, detected by a sensing device such as a camera unit.

Then, when the degree of coincidence between the road shape on the road map and the road shape of the lane detected by the sensing device is high, it is determined that the own vehicle is traveling along a target travel path, and a driving mode (automatic driving mode) is continued where a control system plays a main role in automatic driving without causing a driver to hold the steering wheel.

When it is determined that the continuation of the automatic driving is difficult, the driving mode is switched to a driving support mode for requiring the driver to hold the steering wheel, or an automatic evacuation mode is executed. In the automatic evacuation mode, the own vehicle is caused to travel on the traveling lane at the minimum regulated or specified speed. Alternatively, the own vehicle is guided to and stopped in a safe place such as a roadside zone.

In the traveling performed in the automatic driving mode, the driver basically does not need to hold the steering wheel or to constantly view ahead, and can relax to some extent until receiving a request for holding the steering wheel from the automatic driving system. Therefore, during the traveling in the automatic driving mode, the driver can perform an action (reading, operation of a mobile phone, or the like) other than the driving operation while seated on the driver's seat.

Meanwhile, for causing the own vehicle to travel by the automatic driving, the automatic driving system recognizes the own vehicle's location with the map locator and acquires static information such as traffic lights, crosswalks, and roadside zones and dynamic information such as a traffic quantity from information of a road map around the own vehicle stored in a dynamic map. Further, the automatic driving system acquires information on indication (lighted color) information of each of the traffic lights (including a pedestrian traffic light) with a sensing device such as an in-vehicle camera and through road-to-vehicle communication and the like. Moreover, the automatic driving system recognizes surrounding obstacles, traveling vehicles, and passersby (pedestrians, bicycle riders, and the like) with the sensing device described above.

By the way, a passerby has an uneasy feeling when, for example, a vehicle approaches the passerby passing on the roadside zone of a narrow roadway, or when the passerby cannot see whether the approaching vehicle recognizes the passerby at the time of the passerby crossing the crosswalk even though the passerby recognizes the approaching vehicle.

When the own vehicle is traveling in the automatic driving mode, the automatic driving system naturally recognizes the passerby, but from the passerby's side, it cannot be clearly determined whether the approaching vehicle is in manual driving by the driver's steering or in automatic driving.

For example, Japanese Unexamined Patent Application Publication (JP-A) No. 2015-174541 discloses a vehicle state notification device in which an automatic driving system detects a passerby (approaching person) approaching an own vehicle, and when there is a possibility of a minor collision with the passerby, the system notifies the passerby that the own vehicle recognizes the passerby by display or voice to eliminate the passerby's uneasy feeling.

SUMMARY

An aspect of the technology provides an automatic driving system. The automatic driving system includes a vehicle control calculator, a forward traveling environment recognizer, a passerby recognition calculator, and a recognition-state notifier. The vehicle control calculator is configured to cause an own vehicle to perform automatic traveling along a traveling route. The forward traveling environment recognizer is configured to acquire information on a traveling environment ahead of the own vehicle. The passerby recognition calculator is configured to recognize a passerby ahead of the own vehicle based on the information on the traveling environment acquired by the forward traveling environment recognizer. The recognition-state notifier is configured to notify the passerby of a recognition state that the passerby is recognized, when the passerby is recognized by the passerby recognition calculator. The passerby recognition calculator examines whether the recognized passerby is facing a direction of the own vehicle based on information on the passerby, acquired by the forward traveling environment recognizer, and specifies the passerby as a notification target passerby when recognizing the passerby facing the direction of the own vehicle. The recognition-state notifier notifies the recognition state to the notification target passerby.

Another aspect of the technology provides an automatic driving system including circuitry. The circuitry is configured to, when causing an own vehicle to perform automatic traveling along a traveling route, acquire information on a traveling environment ahead of the own vehicle, recognize a passerby ahead of the own vehicle based on the acquired information on the traveling environment, and when recognizing the passerby, notify the passerby of a recognition state that the passerby is recognized. The circuitry examines whether the recognized passerby is facing a direction of the own vehicle, specifies the passerby as a notification target passerby when recognizing the passerby facing the direction of the own vehicle, and notifies the notification target passerby of the recognition state.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

A description is given below of some embodiments of the technology with reference to the accompanying drawings. Note that the following description is directed to illustrative embodiments of the technology and not to be construed as limiting to the technology. Factors including, without limitation, numerical values, shapes, materials, components, positions of the components, and how the components are coupled to each other are illustrative only and not to be construed as limiting to the technology. Further, elements in the following embodiments which are not recited in a most-generic independent claim of the disclosure are optional and may be provided on an as-needed basis. The drawings are schematic and are not intended to be drawn to scale.

In an automatic driving system, since an approaching passerby is constantly recognized, when a lateral distance from the passerby is relatively narrow at the time of passing the passerby, an own vehicle is caused to go slowly or stop until the passerby passes. When a passerby is trying to cross a crosswalk where a pedestrian traffic light is not installed, the crossing passerby is detected, and the own vehicle is automatically stopped in front of the stop line of the crosswalk. Thus, even when the passerby does not recognize the approaching vehicle, the vehicle safely passes by the passerby or automatically stops to wait for the passerby to pass, so long as the vehicle is performing automatic driving through the automatic driving system.

Therefore, even when the vehicle performing the automatic driving through the automatic driving system approaches a passerby, the passerby who does not recognize the approaching vehicle, or knows in advance that the vehicle will pass safely even though recognizing the approaching vehicle, originally has no uneasy feeling, and there is thus no need to notify the passerby that the own vehicle recognizes the passerby.

However, when the technique disclosed in the document described above is applied to the automatic driving system, in a case of detection of passersby close to the own vehicle, the recognition is notified to all the detected passersby, thus causing a disadvantage where a passerby having no uneasy feeling receives unnecessary notification.

Accordingly, it is desirable to provide an automatic driving system that accurately senses a passerby having an uneasy feeling about the approach of an own vehicle and notifies the passerby that the own vehicle is approaching, thereby enabling elimination of the uneasy feeling of the passerby and reduction of unnecessary notification.

Figure 1:
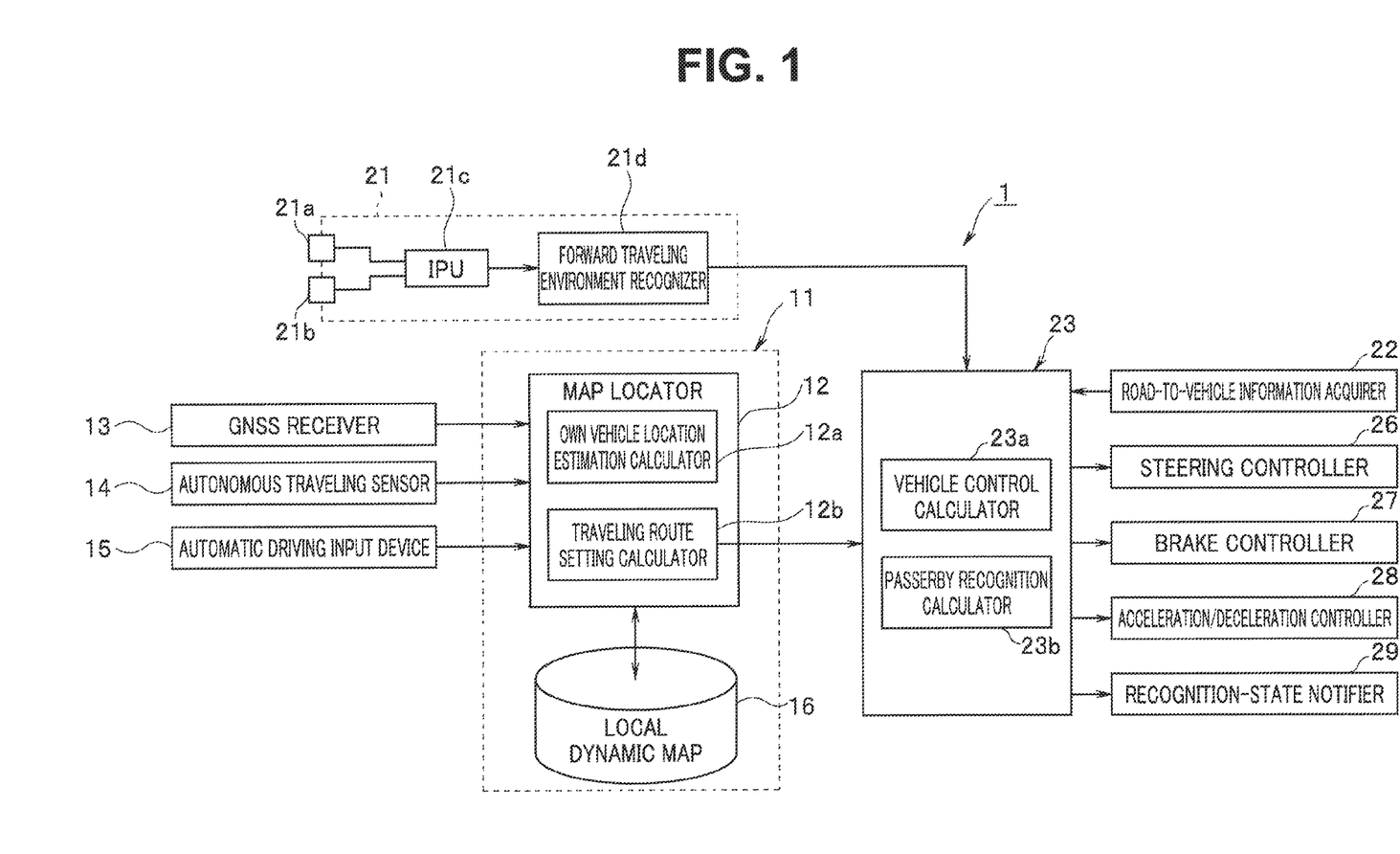
FIG. 1 is a schematic configuration diagram of an automatic driving system.

Hereinafter, an embodiment of the technology will be described based on the drawings. An automatic driving system 1 illustrated in FIG. 1 is mounted in an own vehicle M (see FIG. 2). The automatic driving system 1 includes a locator unit 11 for detecting the current location of the own vehicle M (own vehicle's location) and generating a traveling route to a destination, a camera unit 21 for acquiring information on traveling environment information ahead of the own vehicle M, and an automatic driving control unit 23. The locator unit 11 and the camera unit 21 construct a redundant system in which, when malfunction occurs in one of the locator unit 11 and the camera unit 21, the automatic driving support is temporarily continued in the other. Then, the automatic driving control unit 23 compares the information acquired from the locator unit 11 and the information acquired from the camera unit 21 and continues the automatic driving mode when a degree of coincidence is high in a shape of the road where the own vehicle is currently traveling.

The locator unit 11 estimates the own vehicle's location on a road map and acquires road map data around and ahead of the own vehicle's location. Meanwhile, the camera unit 21 obtains a road curvature at the center of a partition line for partitioning, into left and right sections, a lane (own vehicle traveling lane) where the own vehicle M is traveling, and calculates a deviation of a lateral position in a width direction of the own vehicle M with reference to the center of the left/right partition line.

The locator unit 11 has a map locator calculator 12 and a high-precision road map database 16. The map locator calculator 12, a forward traveling environment recognizer 21d to be described later, and the automatic driving control unit 23 are made up of a known microcomputer including a central processing unit (CPU), a random access memory (RAM), a read-only memory (ROM), a nonvolatile memory, and the like, and peripheral devices. In the ROM, fixed data such as a program to be executed by the CPU and a data table is stored in advance.

Further, a global navigation satellite system (GNSS) receiver 13, an autonomous traveling sensor 14, and an automatic driving input device 15 are coupled to an input side of the map locator calculator 12. The GNSS receiver 13 receives positioning signals emitted from a plurality of positioning satellites.

The autonomous traveling sensor 14 makes autonomous driving possible in an environment where the sensitivity of reception from the GNSS satellite is low and the positioning signal cannot be received effectively, such as an environment inside a tunnel during the traveling. The autonomous traveling sensor 14 includes a vehicle speed sensor, a yaw rate sensor, a longitudinal acceleration sensor, and the like.

The automatic driving input device 15 is a terminal device to be operated by a passenger (mainly a driver), and the passenger operates the automatic driving input device 15 to input information necessary for executing the automatic driving mode, such as on/off of an automatic driving switch and information on a destination and a transit point (facility name, address, telephone number, etc.). Then, the input information is read in the map locator calculator 12. The map locator calculator 12 includes an own vehicle location estimation calculator 12a and a traveling route setting calculator 12b.

The high-precision road map database 16 is a large-capacity storage medium such as a hard disc drive (HDD) and stores high-precision road map information (local dynamic map) which is known. The high-precision road map information has a hierarchical structure in which, on a static information layer in the lowest hierarchy to serve as the base, additional map information necessary for supporting automatic traveling is superimposed. The additional map information includes static location information, such as a type of road (general road, highway, etc.), a road shape, a left/right partition line, road signs, stop lines, intersections, and traffic lights, and dynamic location information, such as information on traffic congestion and traffic regulation due to an accident or construction. Note that the road map information (local dynamic map) is sequentially updated by reading road map information which is necessary at the time of causing the own vehicle M to travel from a global dynamic map that is stored in a cloud server (not illustrated) and updated sequentially.

The own vehicle location estimation calculator 12a acquires the current location coordinates (latitude, longitude) of the own vehicle M based on the positioning signal received by the GNSS receiver 13, and performs map matching of the location coordinates onto the road map information to estimate the own vehicle's location (current location) on the road map. When the positioning signal cannot be effectively received due to the low sensitivity of reception from the GNSS satellite, the map locator calculator 12 reads a signal received by the autonomous traveling sensor 14. The map locator calculator 12 then performs localization from the moving distance and the orientation based on a vehicle speed detected by the vehicle speed sensor, a yaw rate (yaw angle speed) detected by the yaw rate sensor, longitudinal acceleration detected by the longitudinal acceleration sensor, and the like. Note that the vehicle speed detected by the vehicle speed sensor is also read in the automatic driving control unit 23.

Based on the location coordinates of the own vehicle's location estimated by the own vehicle location estimation calculator 12a and the location coordinates (latitude, longitude) of the destination (and the transit point) input from the automatic driving input device 15, with reference to the local dynamic map stored in the high-precision road map database 16, the traveling route setting calculator 12b generates a traveling route linking the own vehicle's location and the destination (the destination via the transit point when the transit point has been set) in accordance with pre-set route conditions (recommended route, fastest route, etc.). Even when the automatic driving switch provided in the automatic driving input device 15 is on, in a case where the destination information has not been input, the traveling route setting calculator 12b generates a traveling route for causing the own vehicle M to go straight along the lane where the own vehicle M is currently traveling.

Meanwhile, the camera unit 21 is fixed to the upper center of the front in the interior of the own vehicle M, and has an image processing unit (IPU) 21c, the forward traveling environment recognizer 21d, and an in-vehicle camera (stereo camera) made up of a main camera 21a and a sub-camera 21b that are disposed in symmetrical positions across the center in the vehicle width direction. The camera unit 21 captures reference image data with the main camera 21a and captures comparative image data with the sub-camera 21b.

Both of these pieces of image data are subjected to image processing in the IPU 21c. The forward traveling environment recognizer 21d reads the reference image data and the comparative image data subjected to the image processing in the IPU 21c. Then, the forward traveling environment recognizer 21d recognizes object data from the reference image data by pattern matching or the like and further calculates distance data of the same object in each of the images based on the parallax of the reference image data and the comparative image data (the distance from the own vehicle M to the object) by using the principle of triangulation and the like, to acquire the recognized object data and the distance data as forward traveling environment information.

The object acquired by the forward traveling environment recognizer 21d as the forward traveling environment information includes, in addition to the information of the partition line for partitioning the own vehicle traveling lane into the left and right sections as described above, roadside zones, crosswalks, road signs, vehicle traffic lights, and roadside objects (guardrails, rubber poles, planting, etc.) installed on the boundary between the roadside zone and the roadway, as static information. Moreover, the object to be acquired includes, as dynamic information, a preceding vehicle (including a motorcycle) traveling ahead of the own vehicle M, a passerby passing on the roadside zone, and the signal indication (lighted color) of the acquired vehicle traffic light.

Note that the term "roadside zone" refers to a pedestrian passage provided by partitioning a road where no sidewalk is provided (or the side where no sidewalk is provided) with road (road surface) marking. Hence the roadway and the roadside zone continue without a level difference. Incidentally, the term "sidewalk" refers to a pedestrian passage provided by physically partitioning the road with curbs, guardrails, or the like. However, in the present embodiment, the terms "roadside zone" and "sidewalk" are collectively referred to as "roadside zones" because strictly distinguishing these only makes it difficult to understand the content.

Further, in the embodiment, the term "passerby" indicates a person moving in the roadside zone, and as its representatives, a pedestrian and a bicycle rider are indicated in the following, but the term "passerby" is not limited thereto.

The forward traveling environment recognizer 21d examines the orientation of the body of the recognized passerby, that is, whether the passerby is facing the driver's seat side of the own vehicle M. Whether the passerby is facing the driver's seat side of the own vehicle M is determined from physical feature quantities. As the physical feature quantities, for example in a case of the face, a comparison is made with pre-set feature quantities of the face (eyes, nose, mouth, chin, etc.) for the determination. Alternatively, the feature quantities of the upper body or eye movement may be compared for the determination.

Note that at least a part of these objects may be detected by a sensing device such as an ultrasonic sensor, a millimeter wave radar, or light detection and ranging (LIDAR) instead of the camera unit 21, or may be detected by a combination of the camera unit 21 and the sensing device. It is also possible to acquire the static information described above from the local dynamic map stored in the high-precision road map database 16.

An input side of the automatic driving control unit 23 is coupled with the forward traveling environment recognizer 21d of the camera unit 21, the map locator calculator 12, and a road-to-vehicle information acquirer 22. The road-to-vehicle information acquirer 22 acquires information from a roadside machine installed on the road through road-to-vehicle communication. The information to be acquired includes a distance to the vehicle traffic light and the signal indication (lighted color) of each of the vehicle traffic light and the pedestrian traffic light.

Meanwhile, an output side of the automatic driving control unit 23 is coupled with a steering controller 26 for causing the own vehicle M to travel along the traveling route, a brake controller 27 for decelerating the own vehicle M by forced braking, an acceleration/deceleration controller 28 for controlling the vehicle speed of the own vehicle M, and a recognition-state notifier 29.

Figure 2:
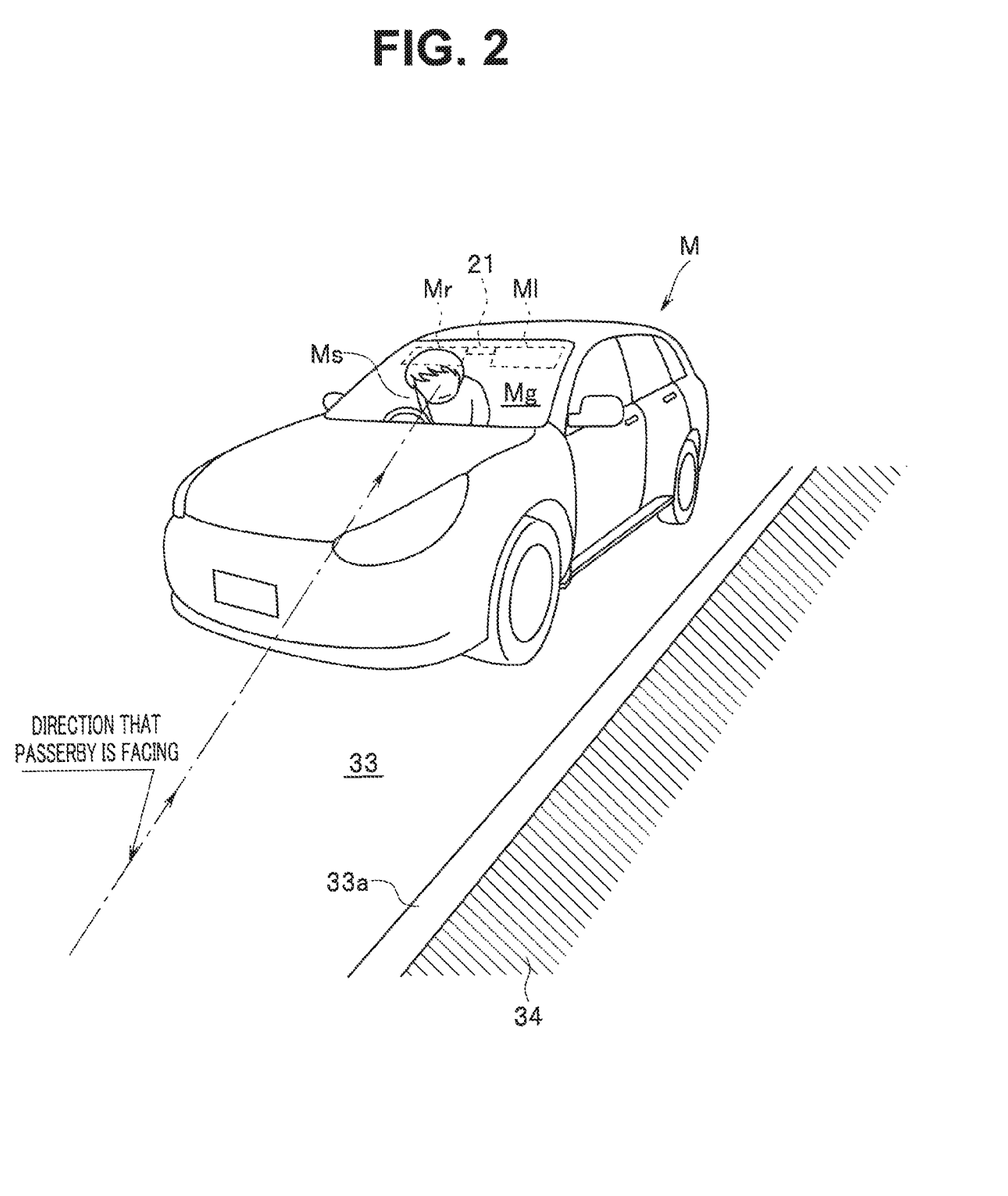
FIG. 2 is a perspective view of a vehicle traveling in an automatic driving mode.

The recognition-state notifier 29 has a head-up display (HUD), and as illustrated in FIG. 2, the recognition-state notifier 29 displays a message toward the outside of the vehicle in each of the left and right display areas Ml, Mr that are set on a windshield Mg of the own vehicle M, to notify the recognition state. In FIG. 2, the left and right display areas Ml, Mr are the top of the windshield Mg and are set in positions not interfering with the views of both the cameras 21a, 21b provided in the camera unit 21.

The automatic driving control unit 23 described above includes a vehicle control calculator 23a and a passerby recognition calculator 23b. The vehicle control calculator 23a controls the steering controller 26, the brake controller 27, and the acceleration/deceleration controller 28 in a predetermined manner so as to cause the own vehicle M to perform automatic traveling along the travel route generated by the traveling route setting calculator 12b based on the positioning signal indicating the own vehicle's location received by the GNSS receiver 13.

At that time, the forward traveling environment information acquired by the forward traveling environment recognizer 21d of the camera unit 21, the distance to the vehicle traffic light 31 acquired by the road-to-vehicle information acquirer 22, and the indication (lighted color) of the vehicle traffic light 31 are detected. Then, at the time when the distance to the vehicle traffic light 31 reaches a predetermined distance, the deceleration control is started when the signal indication of the vehicle traffic light 31 is red, and as illustrated in FIG. 7C, the vehicle is stopped in a predetermined manner at a stop line 32a in front of the crosswalk 32.

Figure 5:
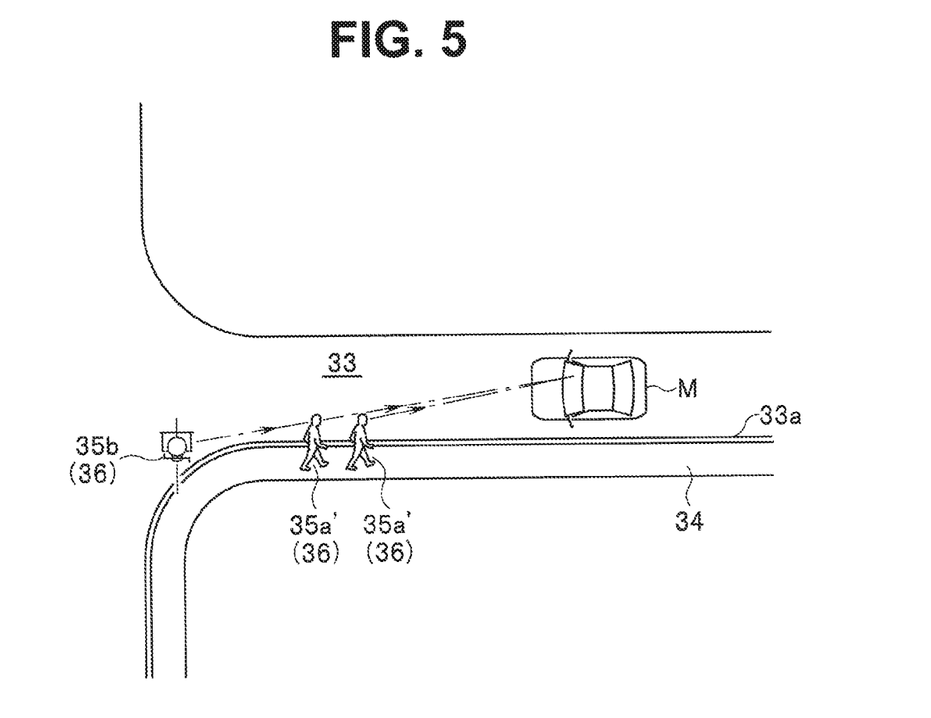
FIG. 5 is an explanatory view illustrating a state in which passerby recognize an approaching vehicle.

Moreover, as illustrated in FIG. 5, during the traveling of the own vehicle M on a narrow roadway 33, when a pedestrian 35a is detected moving along the roadside zone 34 set on the outside of a partition line (roadway outer line) 33a from the front toward the own vehicle M, the automatic driving control unit 23 decelerates the own vehicle M to a speed at which the own vehicle M can safely pass by the pedestrian 35a before a point of passing the pedestrian 35a. As illustrated in FIG. 5, when the bicycle rider 35b is trying to cross the roadway 33, the own vehicle M is stopped in front of the bicycle rider 35b. Note that the pedestrian 35a and the bicycle rider 35b illustrated here are representative examples of the passerby. Hence in the following, the pedestrian 35a and the bicycle rider 35b may also be referred to collectively as a passerby 35.

When detecting the passerby 35 ahead of the own vehicle M, the passerby recognition calculator 23b determines a recognition-state notification condition for the passerby, and when this condition is satisfied, the recognition-state notifier 29 notifies the notification target passerby of the recognition state. The message displayed in each of the left and right display areas Ml, Mr of the windshield Mg is displayed by the recognition-state notifier 29 for the passerby facing the own vehicle M side.

Therefore, when the passerby recognition calculator 23b recognizes a passerby (notification target passerby) satisfying the recognition-state notification condition on the left side of the own vehicle M, the message is displayed in the left-side display area Ml to notify the recognition state. In an opposite case, the message is displayed in the right-side display area Mr to notify the recognition state. When none of the passersby 35 satisfies the recognition-state notification condition, the message is not displayed.

Figure 3:
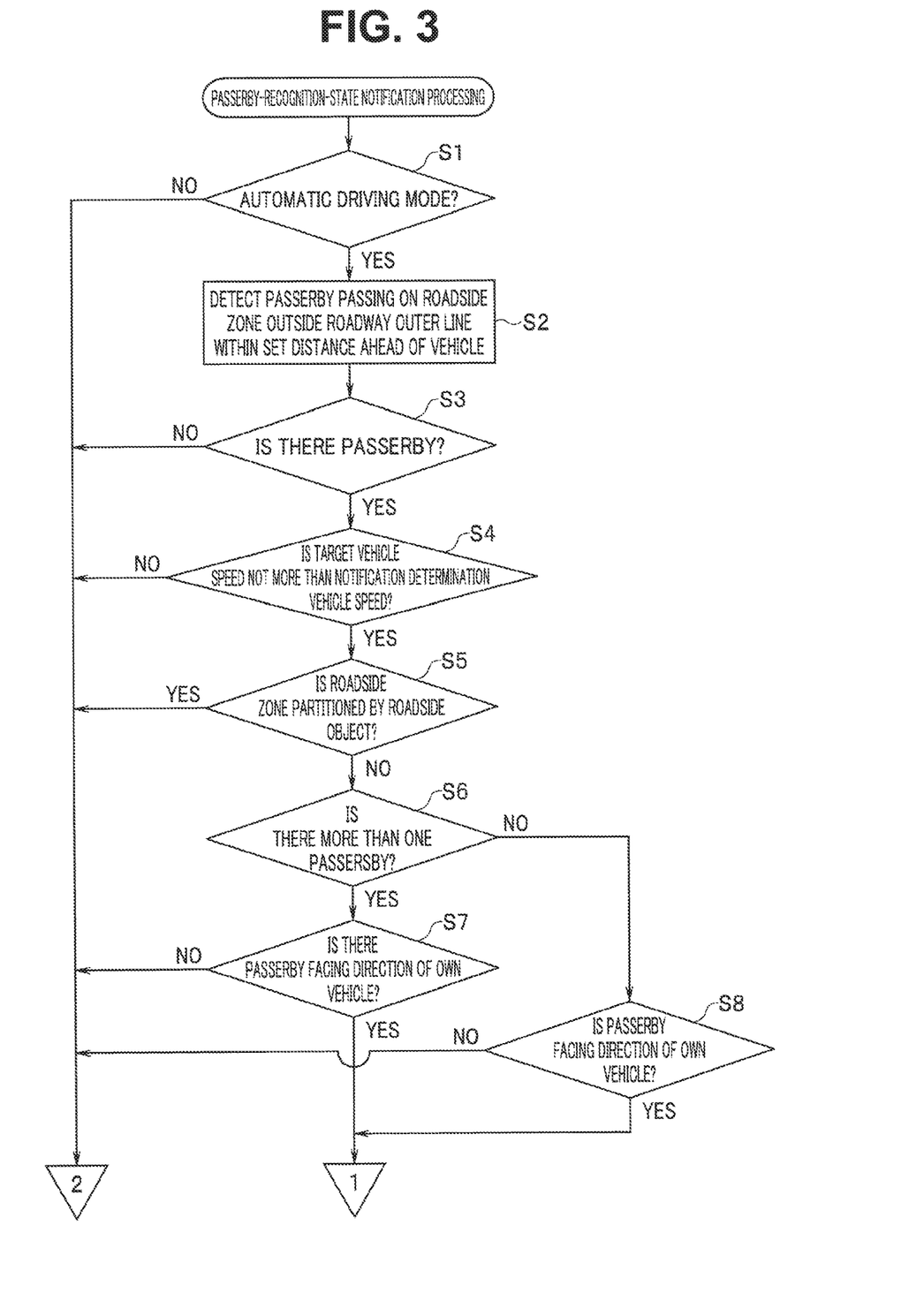
FIG. 3 is a flowchart illustrating a passerby-recognition-state notification processing routine (Part 1)
Figure 4:
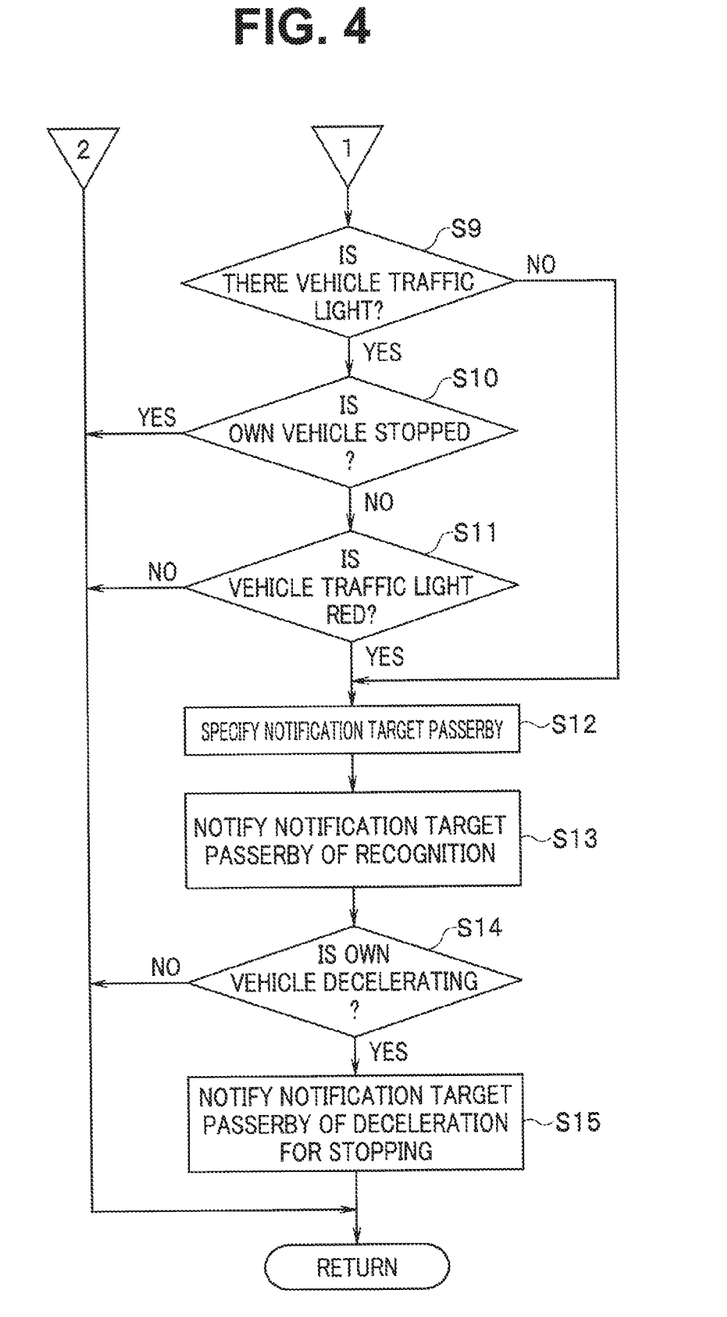
FIG. 4 is a flowchart illustrating the passerby-recognition-state notification processing routine (Part 2)

The determination of the recognition-state notification condition and the processing of notification of the recognition state to the passerby (notification target passerby), executed by the passerby recognition calculator 23b described above, are performed by a passerby-recognition-state notification processing routine illustrated in FIGS. 3 and 4.

In this routine, first, in step S1, based on a signal from the map locator calculator 12, it is examined whether the driving mode is the automatic driving mode. The processing proceeds to step S2 when the automatic driving switch is on and the automatic driving mode has been selected as the driving mode. The processing exits the routine when the automatic driving switch is off or the driving mode except for the automatic driving mode, such as a driving support mode, has been selected.

When the processing proceeds to step S2, a passerby 35 is detected passing on the roadside zone 34 set on the outside of the roadway outer line 33a within a forward setting close range based on the forward traveling environment information acquired by the forward traveling environment recognizer 21d. Note that the forward setting close range is a range in which the passerby has an uneasy feeling when the own vehicle M comes close to the passerby at low speed and is set in advance based on an experiment or the like. In the present embodiment, the forward setting close range is set within 10 to 20 [m] ahead of the own vehicle M and within 1 [m] laterally from the own vehicle M at the time of passing. In addition, the information on the roadside zone 34 may be acquired from the road map information (static information).

Thereafter, the processing proceeds to step S3 to examine whether the passerby 35 passing on the roadside zone 34 has been detected, and when not detected, the processing exits the routine. When the passerby 35 is detected, the processing proceeds to step S4. Then, in steps S4 to S11, it is determined whether the recognition-state notification condition has been satisfied for the detected passerby 35.

First, in step S4, a target vehicle speed and a notification determining vehicle speed, set by the vehicle control calculator 23a, are compared. In a case of the own vehicle M traveling in the automatic driving mode, even when the passerby 35 passing on the roadside zone 34 ahead is detected, the own vehicle M can be caused to cruise without decelerating in traveling on, for example, a general road with a large lane width, thereby preventing the passerby 35 from having an uneasy feeling.

When the own vehicle M is traveling in the automatic driving mode, the vehicle control calculator 23a constantly recognizes obstacles including the passerby 35. Then, at the time of passing the obstacle, the safely passable target vehicle speed is set to control each of the controllers 26 to 28. When the passerby 35 is detected on the roadside zone 34 during the traveling of the own vehicle M in the automatic driving mode on the narrow roadway 33 such as an urban area road, the target vehicle speed is set lower with decrease in space (width) at the time of passing the passerby. When the space is extremely narrow, the own vehicle M stops and waits for the passerby 35 to pass.

However, it is not possible to determine from a passerby 35 side whether the own vehicle M is traveling in the automatic driving mode. Hence, from the standpoint of the passerby 35, the passerby 35 feels uneasy about whether the approaching vehicle (own vehicle M) recognizes himself/herself (passerby 35), and a degree of uneasiness becomes more significant with decrease in the space (width) at the time of passing, in other words, with the target vehicle speed set on the lower speed side. In this case, instead of the target vehicle speed, the actual vehicle speed detected by the vehicle speed sensor and the notification determining vehicle speed may be compared, but the comparison with the target vehicle speed enables instantaneous response to the passerby 35.

When the target vehicle speed exceeds the notification determining vehicle speed, it is determined that the passerby does not have an uneasy feeling about the approaching own vehicle M, and the processing exits the routine. On the other hand, when the target own vehicle speed is not more than the notification determining vehicle speed, the processing proceeds to step S5. Note that the processing in step S4 corresponds to the notification vehicle speed determiner of the technology.

In step S5, it is examined whether the roadside zone 34 on which the passerby 35 has been detected is partitioned by a roadside object 37 (see FIG. 9C) with respect to the roadway 33. The roadside object 37 is for physically partitioning the roadside zone 34 from the roadway 33, such as guardrails, rubber poles, or planting. Note that whether the roadside object 37 is present is determined based on the forward traveling environment information acquired by the forward traveling environment recognizer 21d or the static information of the road map information.

When it is determined that the roadway 33 and the roadside zone 34 are partitioned by the roadside object 37, the processing exits the routine. When it is determined that the roadside zone 34 on which the detected passerby 35 passes is partitioned only by the roadway outer line 33a with respect to the roadway 33, that is, the roadside zone 34 is not physically partitioned, the processing proceeds to step S6.

Figure 9A:
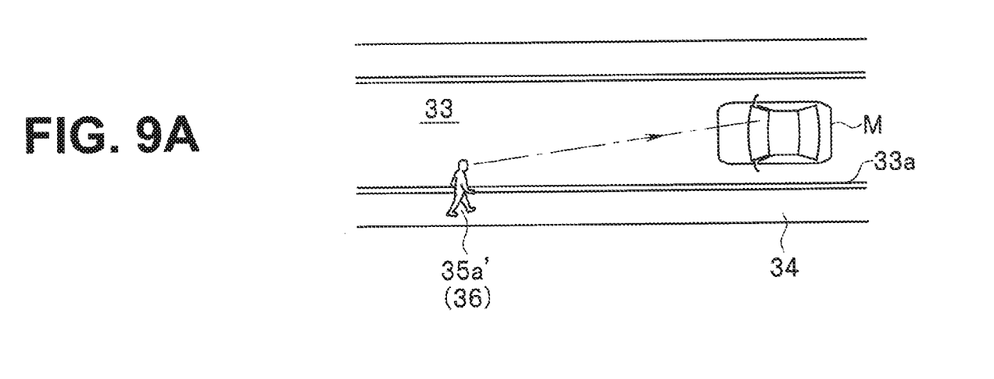
FIG. 9A is an explanatory view illustrating a state in which a passerby is moving forward toward the approaching vehicle.
Figure 9B:
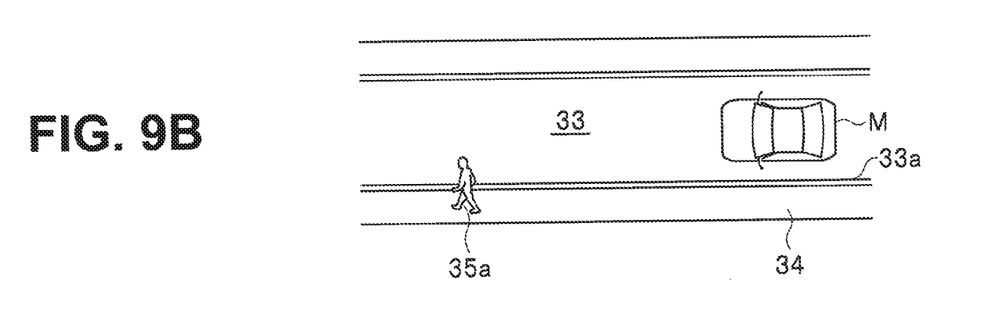
FIG. 9B is an explanatory view illustrating a state in which a passerby is moving forward in the same direction as the approaching vehicle.
Figure 9C:
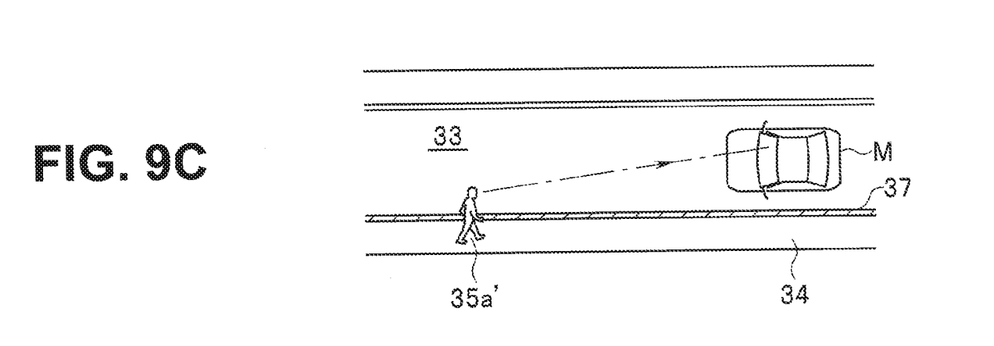
FIG. 9C is an explanatory view illustrating a state in which a roadside object is installed between a roadside zone and a traveling lane.

That is, as illustrated in FIG. 9A, when the roadway 33 and the roadside zone 34 are partitioned only by the roadway outer line 33a, the passerby 35 is more likely to have the uneasiness about the possibility of a minor collision with the approaching vehicle (own vehicle M). In contrast, as illustrated in FIG. 9C, when the roadside zone 34 is partitioned by the roadside object 37 with respect to the roadway 33, the passerby 35 passing on the roadside zone 34 is less likely to have an uneasy feeling about the possibility of a minor collision with the own vehicle M.

Figure 6:
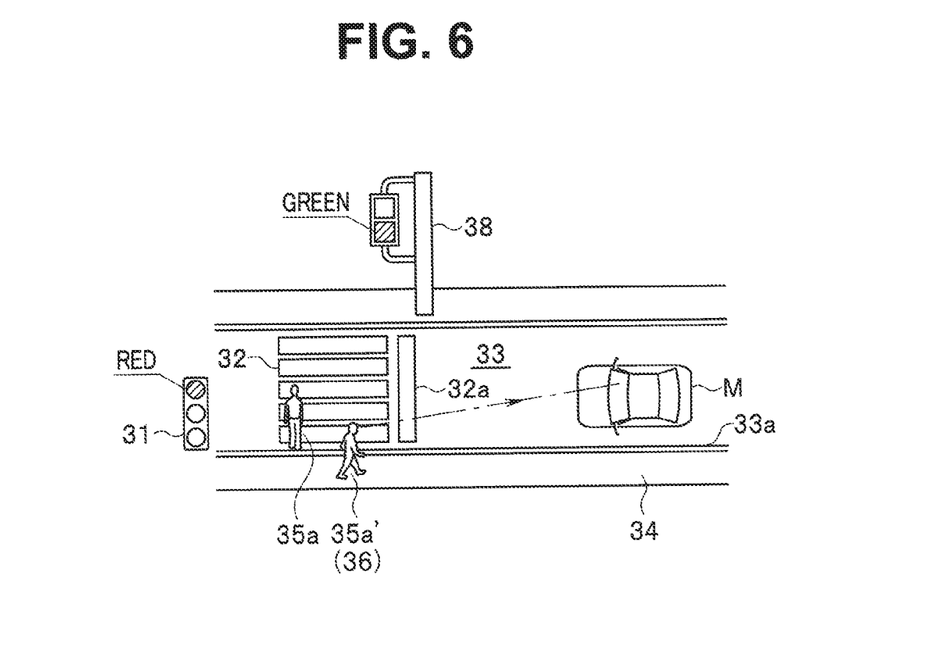
FIG. 6 is an explanatory view illustrating a state in which a green light is on in a pedestrian traffic light, and a passerby is trying to cross the crosswalk.
Figure 8A:
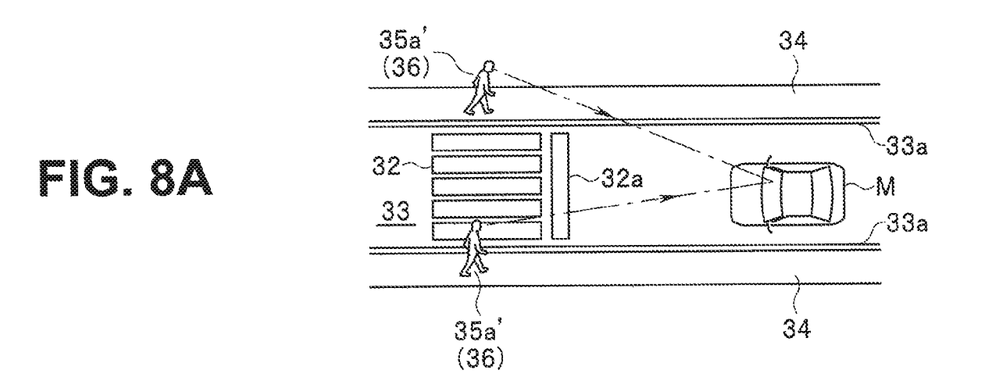
FIG. 8A is an explanatory view illustrating a state in which a plurality of passersby trying to cross the crosswalk recognize the approaching vehicle.

Subsequently, when the processing proceeds to step S6, it is examined whether a plurality of passersby 35 have been detected traveling on the roadside zone 34 that is partitioned only by the roadway outer line 33a with respect to the roadway 33. For example, as illustrated in FIGS. 5 and 6, the plurality is not limited to a case where a plurality of passersby 35 (pedestrian 35a, bicycle rider 35b) are detected on one of the roadside zones 34 (a front passenger side in the figures), but also includes a case where a plurality of passersby 35 are detected on the left and right roadside zones 34 as illustrated in FIG. 8A.

Then, when the plurality of passersby 35 have been detected, the processing proceeds to step S7, or when the detected passerby 35 is only one person, the processing branches to step S8.

When the processing proceeds to step S7, the passerby 35 facing an own vehicle M side is examined among the plurality of passersby 35. In the present embodiment, the pedestrian 35a and the bicycle rider 35b are illustrated as representatives of the passerby 35. Therefore, the representatives of the passerby 35 facing the own vehicle M side will also be described as a pedestrian 35a' and the bicycle rider 35b.

As described above, when the own vehicle M is traveling in the automatic driving mode, the vehicle control calculator 23a constantly recognizes the passersby 35 within the forward set distance. Therefore, the passerby 35 having the uneasy feeling may only be notified that the own vehicle M recognizes the passerby 35, and the passerby 35 not having an uneasy feeling need not be notified.

In FIG. 5, the bicycle rider 35b and two pedestrians 35a' trying to cross the roadway 33 are facing the direction of the own vehicle M from one roadside zone 34. In FIG. 8A, the pedestrians 35a' passing on the left and right roadside zones 34, respectively, are facing the direction of the own vehicle M as trying to cross the crosswalk 32 where no traffic light is installed. On the other hand, as illustrated in FIG. 6A, the signal indication of the vehicle traffic light 31 is red, and hence the vehicle control calculator 23a performs the deceleration control so as to stop the own vehicle M at the stop line 32a in front of the crosswalk 32. The pedestrian 35a waiting for the signal has begun to cross without caring about the own vehicle M because the signal indication of a pedestrian traffic light 38 has been switched to green. In contrast, the pedestrian 35a' is aware of the approach of the own vehicle M and facing the direction of the own vehicle M.

As described above, since the signal indication of the vehicle traffic light 31 is red, the own vehicle M certainly stops at the stop line 32a. Hence the pedestrian 35a not caring about (indifferent to), or not aware of, the approach of the own vehicle M does not need to dare to be notified that the own vehicle M will stop, and the pedestrian 35a' caring about the approach of the own vehicle M may only be notified.

Therefore, when all the passersby 35 are crossing without caring about the approach of the own vehicle M, the processing exits the routine. On the other hand, when the passerby 35 caring about the approach of the own vehicle M (pedestrian 35a' in FIG. 6) is detected, the processing proceeds to step S9.

Further, when the processing branches from step S6 to step S8, it is examined whether the passerby 35 is facing the direction of the own vehicle M in the same manner as described above. Then, when the passerby 35 is not facing the direction of the own vehicle M, it is determined that the passerby 35 does not have an uneasy feeling, and the processing exits the routine. On the other hand, when the passerby 35 is facing the direction of the own vehicle M, the processing proceeds to step S9. Note that the processing in steps S7 and S8 corresponds to a passerby position determiner of the technology.

Figure 7A:
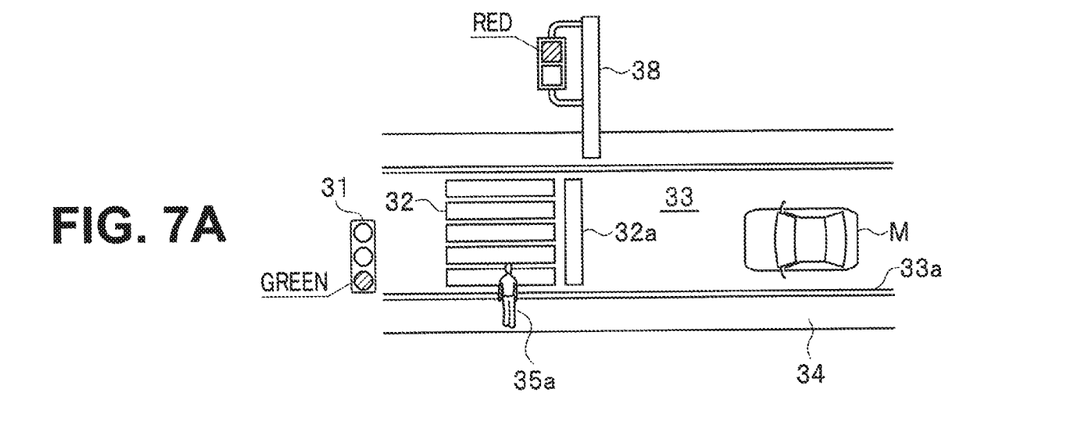
FIG. 7A is an explanatory view illustrating a state in which a passerby waiting for a signal does not recognize the approaching vehicle.

For example, as illustrated in FIG. 7A, when the signal indication of the vehicle traffic light 31 is green and the pedestrian 35a is waiting for the signal because the signal indication of the pedestrian traffic light 38 is red, in a case where the pedestrian 35a is not facing the direction of the own vehicle M, it is determined that the pedestrian 35a does not care about, or is not aware of, the approach of the own vehicle M and thus does not have an uneasy feeling. This also applies to a case where the pedestrian 35a is walking in the same direction as the own vehicle M without looking back, as illustrated in FIG. 9B.

Figure 10:
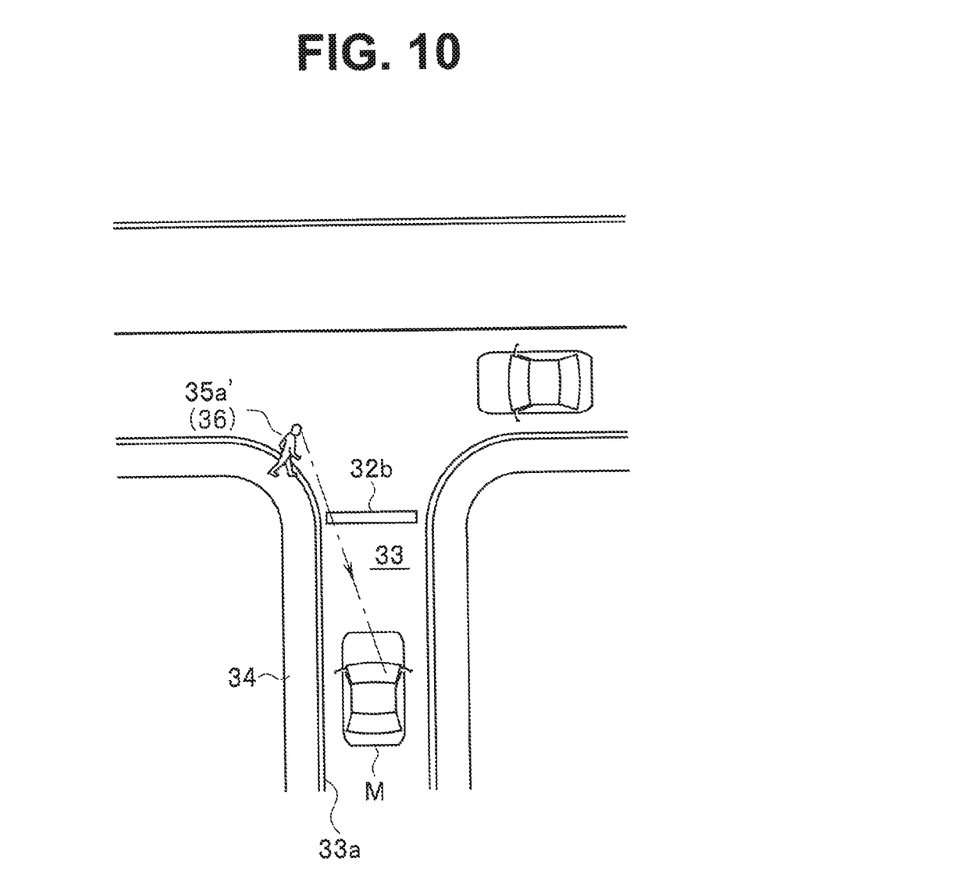
FIG. 10 is an explanatory view illustrating a state in which a passerby crosses ahead of the vehicle entering an intersection.

Further, as illustrated in FIG. 10, for example, when the own vehicle M traveling on the roadway 33 is trying to enter a priority road from a three-way junction, in a case where the pedestrian 35a' trying to cross ahead of the own vehicle M is facing the direction of the own vehicle M, it is determined that the pedestrian 35a' has an uneasy feeling about whether the own vehicle M will stop at the stop line 32b.

When the vehicle traffic light 31 has been detected, the processing proceeds to step S10. When the vehicle traffic light 31 is not detected, it is determined that the recognition-state notification condition is satisfied, and the processing jumps to step S12.

When the processing proceeds to step S10, it is examined whether the own vehicle M is stopped at the stop line 32a in front of the crosswalk 32 based on the deceleration control executed by the vehicle control calculator 23a or based on the forward traveling environment information acquired by the forward traveling environment recognizer 21d. As illustrated in FIG. 7C, in a case that the own vehicle M is stopped at the stop line 32a, it is determined that the passerby 35 (the pedestrian 35a' in the figure) does not have an uneasy feeling even when facing the direction of the own vehicle M, and the processing exits the routine. On the other hand, when the own vehicle M is traveling, the processing proceeds to step S11.

In step S11, it is examined whether the signal indication of the vehicle traffic light 31 is red. When the signal indication is red, it is determined that the recognition-state notification condition is satisfied, and the processing proceeds to step S12. When the signal indication is green or yellow, the processing exits the routine. In a state where the signal indication of the vehicle traffic light 31 is red, the signal indication of the pedestrian traffic light 38 is green, and the passersby 35 having waited for the signal begin the crossing. At that time, for example, as illustrated in FIG. 6, it can be determined that the passerby 35 (the pedestrian 35a' in the figure) facing the direction of the approaching own vehicle M has an uneasy feeling about whether the own vehicle M will stop at the stop line 32a in front of the crosswalk 32.

When the processing proceeds from step S9 or step S11 to step S12, the passerby 35 who has satisfied the recognition-state notification condition determined in steps S4 to S11 described above is specified as a notification target passerby 36. In the figures, the pedestrian 35a' in each of FIGS. 5, 6, 7B, 8, 9A, and 10 and the bicycle rider 35b in FIG. 5 are the notification target passersby, and reference numeral 36 is thus attached thereto in parentheses.

Then, the processing proceeds to step S13, and the own vehicle M transmits a notification command signal to the recognition-state notifier 29 so as to notify the notification target passerby 36 that the own vehicle M recognizes the notification target passerby 36. Then, upon receipt of the notification command signal from the passerby recognition calculator 23b, the recognition-state notifier 29 displays a message of "recognizing the passerby" toward the outside of the vehicle in each of the display areas Ml, Mr that are set on the windshield Mg, to notify the recognition state. This can eliminate the uneasy feeling of the notification target passerby 36.

At that time, as illustrated in FIGS. 5, 7B, 9A, and 10, when the notification target passerby 36 facing the direction of the own vehicle M is only on the left side, the message is displayed only in the left-side display area Ml. Similarly, when the notification target passerby 36 is only on the right side, the message is displayed only in the right-side display area Mr. Further, as illustrated in FIG. 8A, when the notification target passersby 36 are passing on the left and right roadside zones 34, the message is displayed on each of the left and right display areas Ml, Mr.

Further, for example, as illustrated in FIG. 6, due to the coexistence of the pedestrian 35a' having an uneasy feeling and the pedestrian 35a not caring about the approach of the own vehicle M on the roadside zone 34, the recognition state in the form of the message is consequently notified also to the pedestrians 35a not caring about approaching. However, since the pedestrian 35a is not originally facing the direction of the own vehicle M, the pedestrian 35a does not feel uncomfortable or annoyed.

As a result, since the notification is made only to the roadside zone 34 side where the notification target passerby 36 is passing, the notification is not made to the roadside zone 34 side where only the passerby 35 not caring about the approach of the own vehicle M (for example, in a case where the roadside zone 34 is partitioned by the roadside object 37 as illustrated in FIG. 9C), thereby not causing the passerby 35 to feel uncomfortable.

Figure 7B:
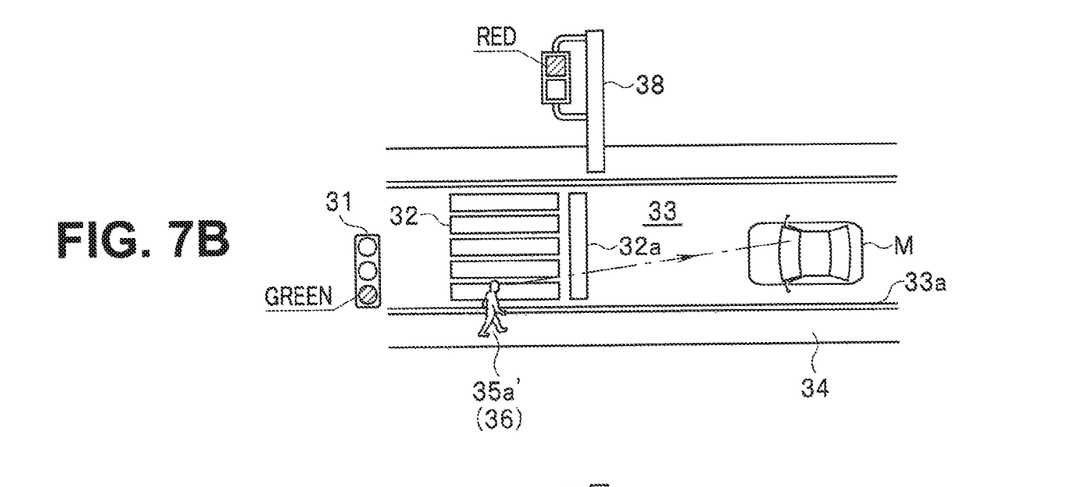
FIG. 7B is an explanatory view illustrating a state in which a passerby waiting for the signal recognizes the approaching vehicle.
Figure 7C:
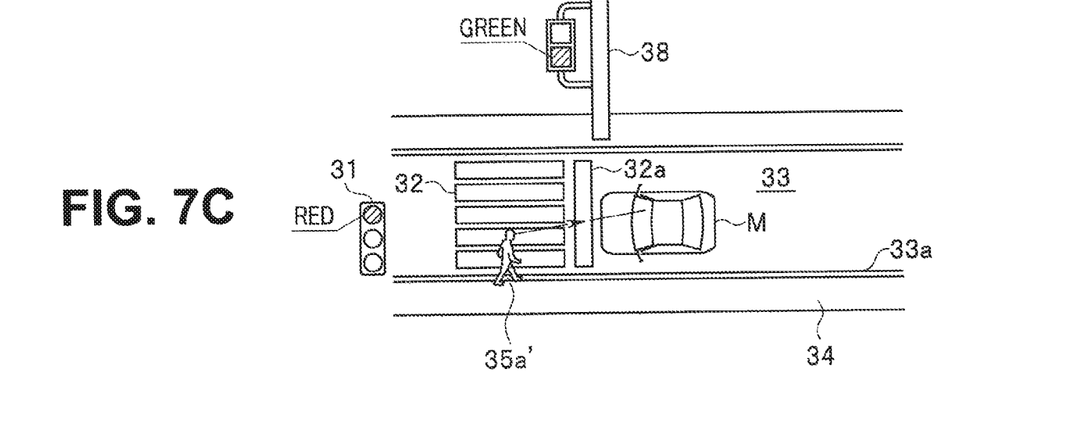
FIG. 7C is an explanatory view illustrating a state in which the signal indication of a vehicle traffic light is red, and the vehicle is stopped at a stop line.

Thereafter, the processing proceeds to step S14, and it is determined whether the own vehicle M is decelerating for stopping based on a control state in the vehicle control calculator 23a. When the own vehicle M is not decelerating for stopping, the processing exits the routine. Thus, for example, as illustrated in FIG. 7B, when the signal indication of the vehicle traffic light 31 is green and the pedestrian 35a' is waiting for the signal, the own vehicle M passes without decelerating for stopping. Hence the own vehicle M passes while keeping the message of recognizing the notification target passerby 36 displayed on the left-side display area Ml. When the passerby 35 is no longer detected, the display of the message is cancelled.

Figure 8B:
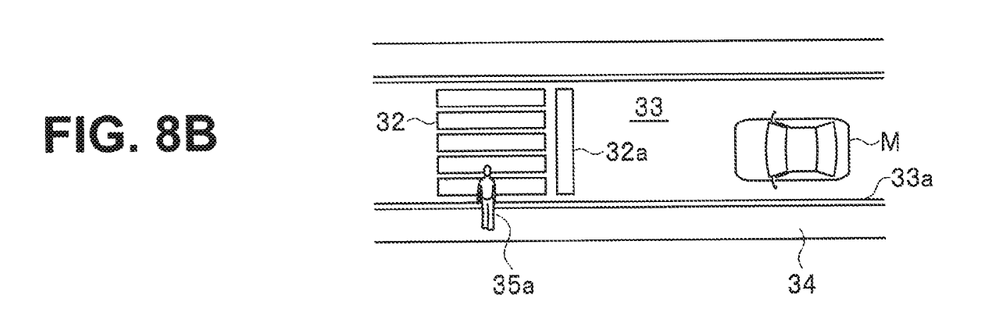
FIG. 8B is an explanatory view of a state in which a passerby trying to cross the crosswalk does not recognize the approaching vehicle.

On the other hand, when the deceleration for stopping is detected, that is, when the own vehicle M is performing the deceleration control for stopping at each of the stop lines 32a, 32b as illustrated in FIGS. 6, 8, and 10, the processing proceeds to step S15. In step S15, a notification command is output to the recognition-state notifier 29 so as to notify the notification target passerby 36 described above that the own vehicle M is decelerating, and the processing exits the routine.

Then, the recognition-state notifier 29 displays a message of "decelerating for stopping," changing from the message of recognizing the notification target passerby 36 currently displayed in each of the display areas Ml, Mr that are set on the windshield Mg. As a result, the passersby 35 having an uneasy feeling about the approach of the own vehicle M can eliminate the uneasy feeling and cross the roadway 33 at ease.

As thus described, according to the present embodiment, the passersby 35 whom the own vehicle M is approaching is detected, and the recognition-state notification condition is determined for each passerby 35, whereby it is possible to accurately sense the passerby having an uneasy feeling about the approach of the own vehicle M. Then, when the recognition-state notification condition is satisfied, the message is displayed in the display area Mr or Ml on the side where the corresponding passerby 35 (notification target passerby 36) passes, whereby the uneasy feeling of the passerby 35 (notification target passerby 36) can be eliminated.

Moreover, when the recognition-state notification condition is not satisfied, for example, as described in FIG. 9C, when the boundary between the roadway 33 and the roadside zone 34 is partitioned by the roadside object 37, the approach of the own vehicle M is not notified to the passersby 35 passing on the roadside zone 34, thereby reducing unnecessary notification and not causing the passersby 35 to feel uncomfortable.

Note that the technology is not limited to the embodiments described above, but, for example, a driver monitoring system for the own vehicle M may be mounted, and when the driver's line of sight is directed to the passerby 35 facing the direction of the own vehicle M (the pedestrian 35a' and the bicycle rider 35b in the present embodiment), the recognition by the own vehicle M may not be notified to the passerby 35.

In the recognition-state notifier 29, instead of the head-up display (HUD), a light-emitting diode (LED) array, which is an example of visible light having a directivity, may be disposed in a horizontal row at the top of the windshield Mg, or the boundary between the windshield Mg and the roof, two LEDs in the center may be set horizontally far from each other, and the orientation may be set in a fan shape in accordance with the transition to each side.

Then, the LED corresponding to the notification target passerby 36 is appropriately projected to notify the recognition state. In this case, the notification in step S13 and the notification in step S15 are distinguished from each other by lighting and flashing or by indication with different lighted colors, to notify the recognition state.

Each of the map locator calculator 12, the forward traveling environment recognizer 21d, and the automatic driving control unit 23 illustrated in FIG. 1 can be implemented by circuitry including, other than the above microcomputer, at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the map locator calculator 12 including the own vehicle location estimation calculator 12a and the traveling route setting calculator 12b, and the automatic driving control unit 23 including the vehicle control calculator 23a and the passerby recognition calculator 23b. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 1.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

As described above, according to the technology, when a passerby recognized by the forward traveling environment recognizer is facing the direction of the own vehicle, the passerby is specified as a notification target passerby, and the recognition state is notified to the notification target passerby, whereby it is possible to accurately sense a passerby having an uneasy feeling and notify the passerby that the own vehicle is approaching. As a result, it is possible to eliminate the uneasy feeling of the passerby and reduce unnecessary notification to passersby not having an uneasy feeling.

The invention claimed is:

1. An automatic driving system comprising:
   a vehicle control calculator configured to cause an own vehicle to perform automatic traveling along a traveling route;
   a forward traveling environment recognizer configured to acquire information on a traveling environment ahead of the own vehicle;
   a passerby recognition calculator configured to recognize a passerby ahead of the own vehicle on a basis of the information on the traveling environment acquired by the forward traveling environment recognizer; and
   a recognition-state notifier configured to notify the passerby of a recognition state that the passerby is recognized, when the passerby is recognized by the passerby recognition calculator, wherein
   the passerby recognition calculator examines whether the recognized passerby is facing a direction of the own vehicle on a basis of information on the passerby, acquired by the forward traveling environment recognizer, and specifies the passerby as a notification target passerby when recognizing the passerby facing the direction of the own vehicle,
   the recognition-state notifier notifies the recognition state to the notification target passerby, and
   the passerby recognition calculator determines whether the passerby is facing the direction of the own vehicle on a basis of a physical feature quantity of the passerby.

2. The automatic driving system according to claim 1, further comprising
   a vehicle speed determiner configured to compare a vehicle speed of the own vehicle and a pre-set notification determining vehicle speed, wherein
   the passerby recognition calculator examines whether the passerby is facing the direction of the own vehicle when the vehicle speed of the own vehicle is equal to or less than the notification determining vehicle speed by the vehicle speed determiner.

3. The automatic driving system according to claim 1, wherein the passerby recognition calculator recognizes the passerby on the basis of the information on the traveling environment within a pre-set close range ahead of the own vehicle.

4. The automatic driving system according to claim 1, wherein the notified recognition state is a message displayed from a pre-set area on a windshield toward an outside of the own vehicle.

5. The automatic driving system according to claim 1, wherein the notified recognition state is a visible beam projected toward an outside of the own vehicle.

6. The automatic driving system according to claim 1, wherein when the passerby recognition calculator specifies a plurality of notification target passersby, the recognition-state notifier notifies each of the notification target passersby of the recognition state.

7. The automatic driving system according to claim 1, wherein when the own vehicle is decelerating for stopping, the passerby recognition calculator causes the recognition-state notifier to notify the notification target passerby of the deceleration as the recognition state.

8. An automatic driving system comprising:
circuitry configured to, when causing an own vehicle to perform automatic traveling along a traveling route, acquire information on a traveling environment ahead of the own vehicle, recognize a passerby ahead of the own vehicle on a basis of the acquired information on the traveling environment, and when recognizing the passerby, control a notifier so that the notifies the passerby of a recognition state that the passerby is recognized, wherein
the circuitry is further configured to examine whether the recognized passerby is facing a direction of the own vehicle, specify the passerby as a notification target passerby when recognizing the passerby facing the direction of the own vehicle, and notify the notification target passerby of the recognition state, and
wherein whether the passerby is facing the direction of the own vehicle is determined on a basis of a physical feature quantity of the passerby.

* * * * *